US012703157B2

(12) United States Patent
Berionni et al.

(10) Patent No.: US 12,703,157 B2
(45) Date of Patent: Aug. 11, 2026

(54) EQUIPMENT AND PROCESS FOR MAKING A STRUCTURAL ELEMENT IN COMPOSITE MATERIAL

(71) Applicant: LEONARDO S.P.A., Rome (IT)

(72) Inventors: Claudio Berionni, Grottaglie (IT); Nicola Miani, Grottaglie (IT); Pasquale Gambardella, Grottaglie (IT)

(73) Assignee: LEONARDO S.P.A. (IT)

( * ) Notice: Subject to any disclaimer, the term of this patent is extended or adjusted under 35 U.S.C. 154(b) by 125 days.

(21) Appl. No.: 18/855,787

(22) PCT Filed: Apr. 12, 2023

(86) PCT No.: PCT/IB2023/053733

§ 371 (c)(1),
(2) Date: Oct. 10, 2024

(87) PCT Pub. No.: WO2023/199236

PCT Pub. Date: Oct. 19, 2023

(65) Prior Publication Data

US 2025/0249644 A1 Aug. 7, 2025

(30) Foreign Application Priority Data

Apr. 14, 2022 (IT) ........................ 102022000007511

(51) Int. Cl.
*B29C 70/32* (2006.01)
*B29C 33/30* (2006.01)
(Continued)

(52) U.S. Cl.
CPC ............ *B29C 70/32* (2013.01); *B29C 33/301* (2013.01); *B29C 33/307* (2013.01);
(Continued)

(58) Field of Classification Search
CPC ..... B29C 70/32; B29C 53/824; B29C 33/301; B29C 33/307; B29C 33/485
See application file for complete search history.

(56) References Cited

U.S. PATENT DOCUMENTS 8,454,870 B2 * 6/2013 Hollensteiner ....... B29C 70/446 264/258
9,376,219 B2 6/2016 Sibona et al.
2015/0224679 A1 8/2015 Sana et al.

FOREIGN PATENT DOCUMENTS

WO 2007148301 A2 12/2007

OTHER PUBLICATIONS

Search Report issued in International Application No. PCT/IB2023/053733.

* cited by examiner

*Primary Examiner* — Scott W Dodds
(74) *Attorney, Agent, or Firm* — The Belles Group, P.C.

(57) ABSTRACT

The invention relates to equipment for making a structural element of composite material. The equipment comprises a frame and a laminating mandrel, which is mounted on the frame so that it can rotate about its own central axis; the support frame comprises two headers; the laminating mandrel comprises a central shaft, sectors angularly spaced apart about the central axis, and actuators extending between the central shaft and respective sectors to move the sectors between an expanded laminating position and a contracted position. The equipment further comprises first constraining means for connecting the sectors, arranged in the expanded position, to movable portions of the headers, and second constraining means connecting the actuators to the sectors so as to enable the extraction of the central shaft and actuators from the equipment when the sectors, in the expanded (Continued)

position, are connected to the movable portions of the headers by the first constraining means.

14 Claims, 9 Drawing Sheets

(51) Int. Cl.

| | |
|---|---|
| ***B29C 53/82*** | (2006.01) |
| ***B64F 5/10*** | (2017.01) |
| *B29K 63/00* | (2006.01) |
| *B29K 105/08* | (2006.01) |
| *B29K 307/04* | (2006.01) |
| *B29L 31/30* | (2006.01) |

(52) U.S. Cl.
CPC .............. *B29C 53/824* (2013.01); *B64F 5/10* (2017.01); *B29K 2063/00* (2013.01); *B29K 2105/0872* (2013.01); *B29K 2307/04* (2013.01); *B29L 2031/3082* (2013.01)

EQUIPMENT AND PROCESS FOR MAKING A STRUCTURAL ELEMENT IN COMPOSITE MATERIAL

CROSS-REFERENCE TO RELATED APPLICATIONS

This patent application is a U.S. national stage application under 35 U.S.C. § 371 of PCT Application No. PCT/IB2023/053733 filed Apr. 12, 2023, which claims priority to Italian Patent Application No. 102022000007511 filed on Apr. 14, 2022, the entire disclosures of which are incorporated herein by reference.

TECHNICAL FIELD

The present invention relates to equipment and a process for making a structural element in composite material having a longitudinal axis and an axial cavity. It should be noted that the term "for making a structural element in composite material" not only covers the operations or steps for making the structural element, including a passage in an autoclave, but also the subsequent operations or steps of testing and finishing the previously made structural element, as well as any further operations or steps of assembling this structural element with other structural elements.

In particular, the present invention finds advantageous, but not exclusive, application in the construction of closed or open structural elements, for example aircraft fuselages or fuselage portions.

STATE OF THE ART

In the aerospace field, to which the following description will make explicit reference without thereby losing generality, structural elements of the type defined above, made of composite material, are well known. The use of this material is driven by the need to reduce the overall weight of aircraft and eliminate or minimize corrosion problems of aircraft structures.

In the most common solutions, the composite material used is fibre material, e.g. carbon fibre, pre-impregnated with epoxy resin, BMI or other uncured or pre-cured material. The material is deposited in moulds and then processed under temperature and pressure. Other methods use dry fibre, which is usually impregnated with a fluid resin according to a well-known process (e.g. by the method known as "Resin Transfer Moulding" or RTM).

Typically, structural elements of the type described above, such as for example fuselages or parts thereof, are made by bonding a skin in composite material with a plurality of stiffening stringers, which are also made of composite material and generally positioned parallel to the axis of the fuselage or portion thereof.

In particular, each stringer is usually defined by a thin-walled longitudinal section bar, comprising:

- one or two lateral longitudinal flanges suitable for bonding to the skin; and
- a raised portion of predefined geometry protruding transversely with respect to the flange(s).

The stringers most commonly used in the industry have an omega, T, L, J or Z cross section.

The cycle for constructing these types of structural elements or portions thereof generally includes the following steps:

- making;
- trimming and/or drilling;
- non-destructive and dimensional testing;
- surface finishing; and
- assembling.

The most commonly used of the many processes for making a structural element of the type described above are listed below.

According to a first operating mode, in order to produce the stringers, a plurality of layers of uncured composite material are placed on a suitably shaped forming tool.

Once the stringers are produced, they are removed from the forming tool and placed in respective recesses of a tool called mandrel; after this operation, in order to produce the skin, a further plurality of layers of uncured composite material are laminated and made to overlap the stringers placed in the recesses of the mandrel.

The assembly thus formed is then subjected to a co-curing operation in an autoclave by applying appropriate pressure and temperature, in order to cure the composite material, compact the aforementioned layers together and bond the stringers to the skin.

In practice, each stringer is applied rigidly and integrally to one face of the skin, normally the face defining the inner wall of the skin, i.e., the one facing, in use, the inside of the fuselage.

This completes the step of making the structural element.

According to another operating mode, the skin, made by laminating together a plurality of layers of uncured composite material, is bonded, by means of a structural adhesive, to the stringers which have been previously pre-cured after their forming.

In this case, too, the assembly thus formed is placed in an autoclave and subjected to appropriate pressure and temperature, in order to cure the fresh composite material, compact the several layers together and bond the stringers to the skin. This operation is commonly referred to in the industry as co-bonding.

The co-bonding operation may also be carried out by pre-curing the skin only and bonding it to uncured stringers by means of a structural adhesive.

According to a further operating mode, both the skin and the stringers can be pre-cured and then bonded by means of a structural adhesive. This operation is commonly referred to in the industry as bonding and can be done either in an autoclave or at cold temperature.

Depending on the specific application, there are also configurations in which the longitudinal stringers are incorporated in the skin, or other so-called sandwich configurations in which there are two skins that are separated by a closed or open cell filler.

Again, the skin is laminated on the mandrel and cured with the appropriate stiffeners (sandwiches, incorporated skins, etc.) at appropriate pressure and temperature.

In summary, in the co-curing process the components (skin and stiffeners) to be cured are both "fresh", in the co-bonding process one of the elements (skin or stiffener) is already cured, in the bonding process both elements are cured.

Once the curing process is complete, the structural element thus formed is trimmed (the laminated material of the skin is increased from the nominal) and drilled, if required, according to the requirements of the project.

Once the structural element has been obtained, as requested by the project, it is subjected to non-destructive testing to verify its feasibility.

It is also subjected to dimensional measurements to check for any "out of tolerance".

As a result of this testing, rework may be required, where necessary, to restore the features of the product which are required by the project.

The application of protective paints is a necessary and preparatory action for the next step; the composite material must be protected against contact with metallic materials, especially aluminium, UV rays, moisture and anything else required by the project.

Once all the above operations have been completed, the flow of making these structural elements is completed by the installation thereon of other stiffening and non-stiffening elements which are required by the project and complete their configuration.

There is a need in the sector to optimize the process of making these structural elements, by minimizing the overall preparation times and flows.

Moreover, for the same reasons, there is also a need to create a single piece of equipment which allows the entire production cycle described above to be completed in a simple and effective way.

Lastly, there is also a need to use the same equipment to make structural elements of different longitudinal and diametrical dimensions in relation to the longitudinal axis, so that the same equipment can be used for different applications and/or programs.

OBJECT AND SUMMARY OF THE INVENTION

One object of the present invention is to provide equipment for making a structural element in composite material having a longitudinal axis and an axial cavity, which equipment is highly reliable and cost-effective and allows at least one of the requirements specified above and related to equipment of a known type and described above to be met.

According to the invention, this object is achieved by means of equipment as claimed in claim 1.

Another object of the present invention is to provide a process for making a structural element in composite material having a longitudinal axis and an axial cavity, which allows at least one of the requirements specified above and related to the processes of a known type described above to be met in a simple and inexpensive way.

According to the invention, this object is achieved by means of a process as claimed in claim 13.

BRIEF DESCRIPTION OF THE DRAWINGS

For a better understanding of the present invention, a preferred, non-limiting embodiment thereof will be described below purely by way of example and with the aid of the accompanying drawings, wherein.

DETAILED DESCRIPTION

Figures 1, 2:
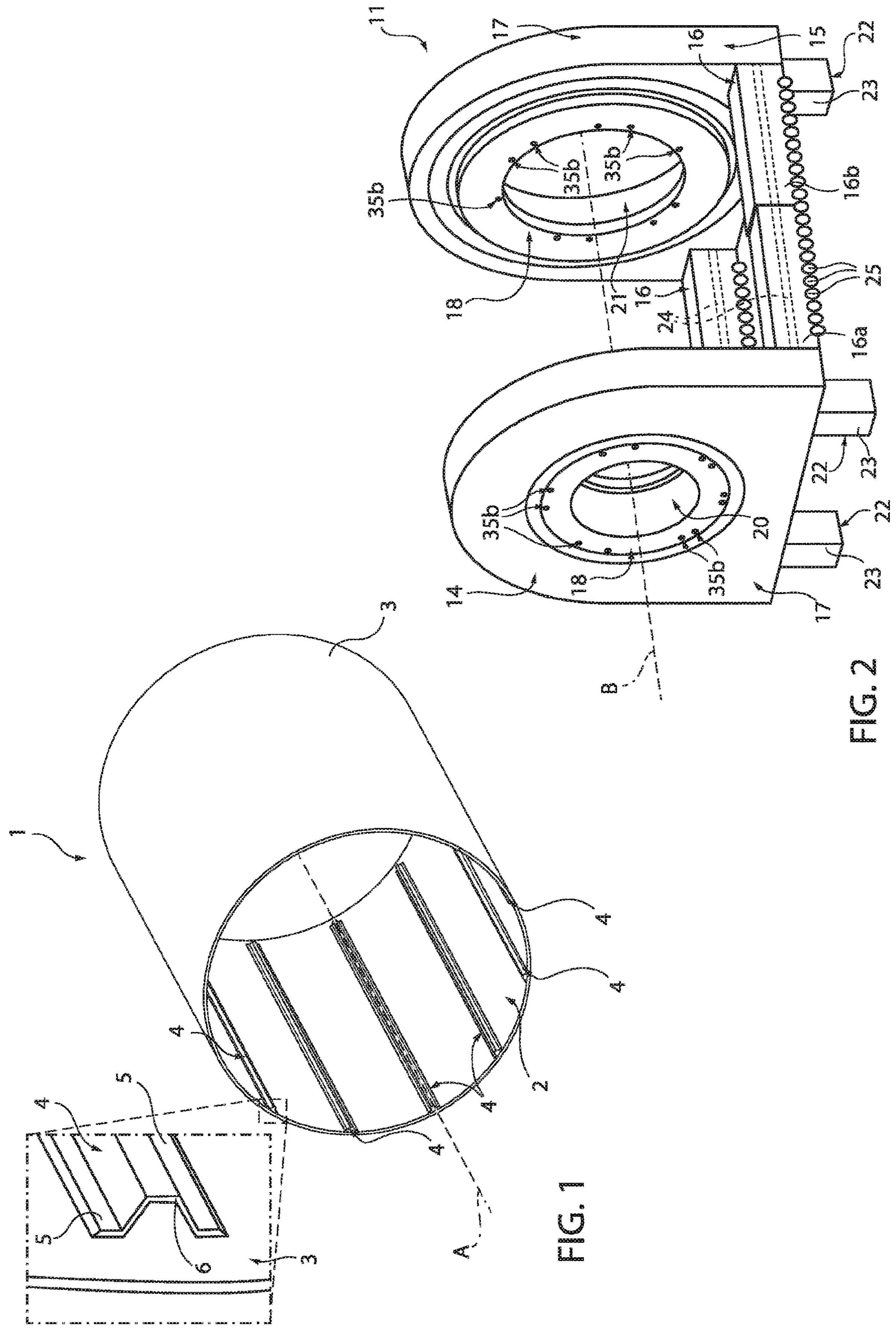
FIG. 1 is a perspective view, with parts removed for clarity, of a structural element in composite material, in particular a portion of an aircraft fuselage, made using the equipment and the process according to the present invention.
FIG. 2 is a perspective view, with parts removed for clarity, of a support frame of the equipment according to the present invention for making the structural element in FIG. 1.

With reference to FIG. 1, number 1 indicates, as a whole, a first example of a structural element in composite material made using the equipment and the process which are the object of the present invention.

In particular, the present description will make explicit reference, without thereby losing generality, to structural elements used in the aviation field, for example an aircraft fuselage or fuselage portion, and to a process for making these structural elements.

According to the preferred embodiment described and illustrated herein, the structural element 1 is intended to be part of an aircraft fuselage (known per se and not shown).

In greater detail, the structural element 1 has a longitudinal axis A and is provided with an axial through cavity 2. In practice, the structural element 1 is a solid of rotation having an axis A; in the present case, the structural element 1 has a cylindrical shape with an axis A.

Alternatively, the structural element 1 could also be roughly similar to a solid of rotation having an axis A. For example, it may also not have a constant cross section along the axis A and possibly have a configuration tapered towards one of its axial ends. The structural element 1 comprises a skin 3 made of composite material and a series of hollow longitudinal stiffening stringers 4 with a closed section.

The stringers 4 extend parallel to the axis A and, in the present case, along the entire axial length of the structural element 1.

In one embodiment, the composite material used is fibre material, e.g. carbon fibre, pre-impregnated with epoxy resin, BMI or other uncured or pre-cured material. The material is deposited in moulds and then processed under temperature and pressure. Other methods use dry fibre, which is usually impregnated with a fluid resin according to a well-known process (e.g. by the method known as "Resin Transfer Moulding" or RTM).

In the solution described in the attached figures, the structural element 1 is obtained by rigidly and integrally applying the stringers 4 to the skin 3 so that each stringer 4 delimits, with the skin 3 itself, a hollow section with a closed profile.

As can be seen in FIG. 1, each stringer 4 comprises two lateral flanges 5, suitable for adhering to the skin 3, and a raised portion 6 centrally located between the flanges 5, protruding with respect to the latter and having a concave shape on one side. In particular, in the example shown, the stringers 4 have an omega cross-section.

Alternatively, the stringers 4 intended to create a hollow section closed with the skin 3 may have a cross section of different shapes, e.g., arc of a circle, semi-circular, rectangular, polygonal, semi-ellipsoidal, semi-oval, etc.

FIGS. 2 to 14 show a piece of equipment (and its components) according to the present invention for making the structural element 1. This equipment is indicated as a whole with the reference number 10.

In particular, the equipment 10 comprises a support frame 11 (shown individually in FIG. 2) and a laminating mandrel 12 (shown individually in FIG. 3A), which is mounted on the support frame 11 so that it can rotate about its own central axis B and defines an outer laminating surface 13, intended, as will be explained in detail below, to be laminated with one or more layers of composite material to be cured or pre-cured.

The support: frame 11 essentially comprises two vertical headers 14, 15, facing each other and parallel to each other, and one or more longitudinal crosspieces 16, in this case two, extending between the headers 14, 15 to connect them at a predetermined distance.

More specifically, the headers 14, 15 are capable of accommodating between them the laminating mandrel 12 and for this purpose extend transversely, in particular orthogonally, to the axis B of the laminating mandrel 12 itself.

Each header 14, 15 comprises a fixed portion 17 and a movable portion 18, coaxially receiving the laminating mandrel 12 and rotatable about the axis B with respect to the fixed portion 17.

Figure 8:
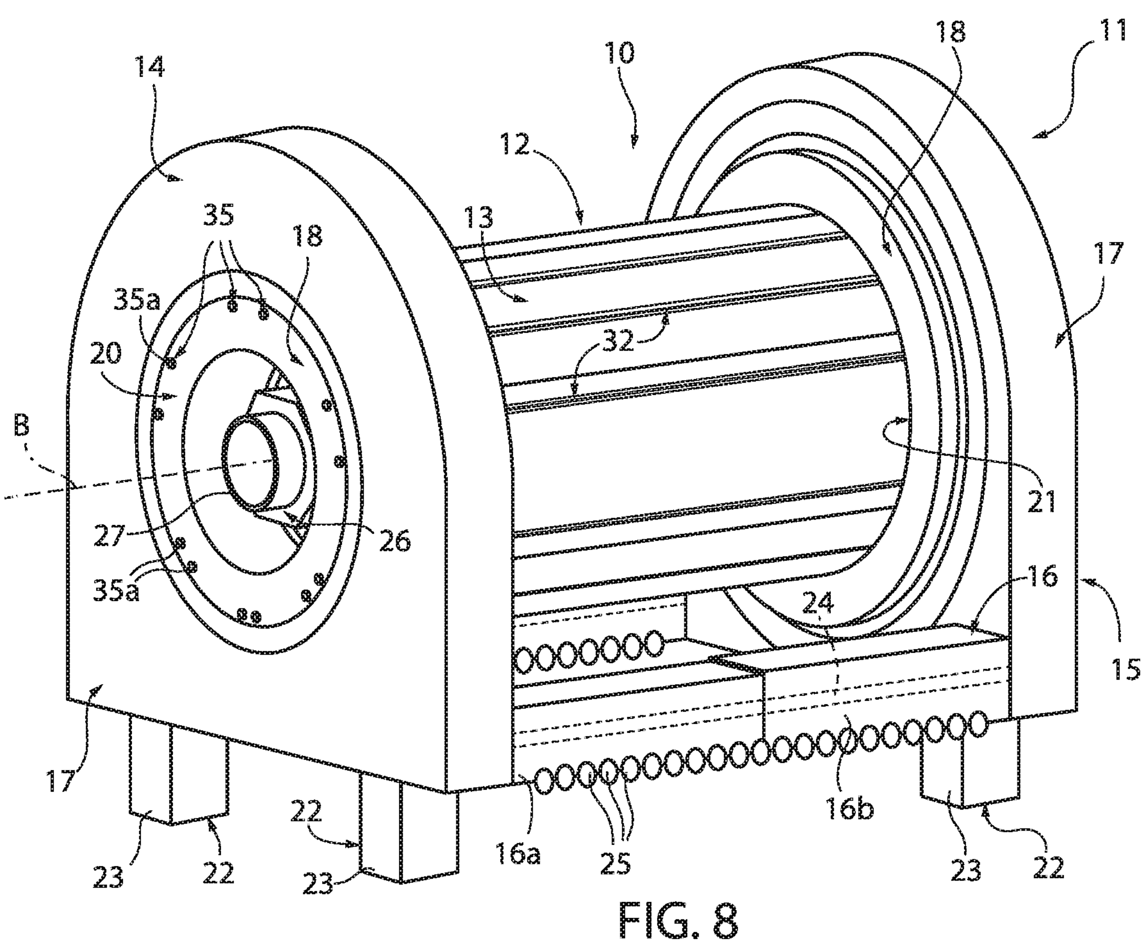
FIG. 8 is a perspective view, with parts removed for clarity, of the equipment according to the present invention in a preparatory step for a laminating operation with uncured or pre-cured composite material.
Figure 9:
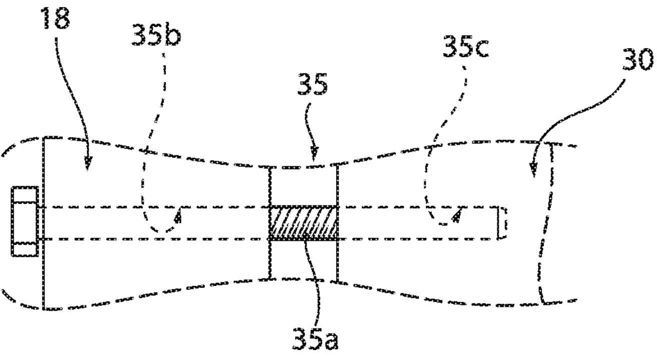
FIG. 9 is a side view, with parts removed for clarity and parts on an enlarged scale, of a detail in FIG. 8.
Figure 11:
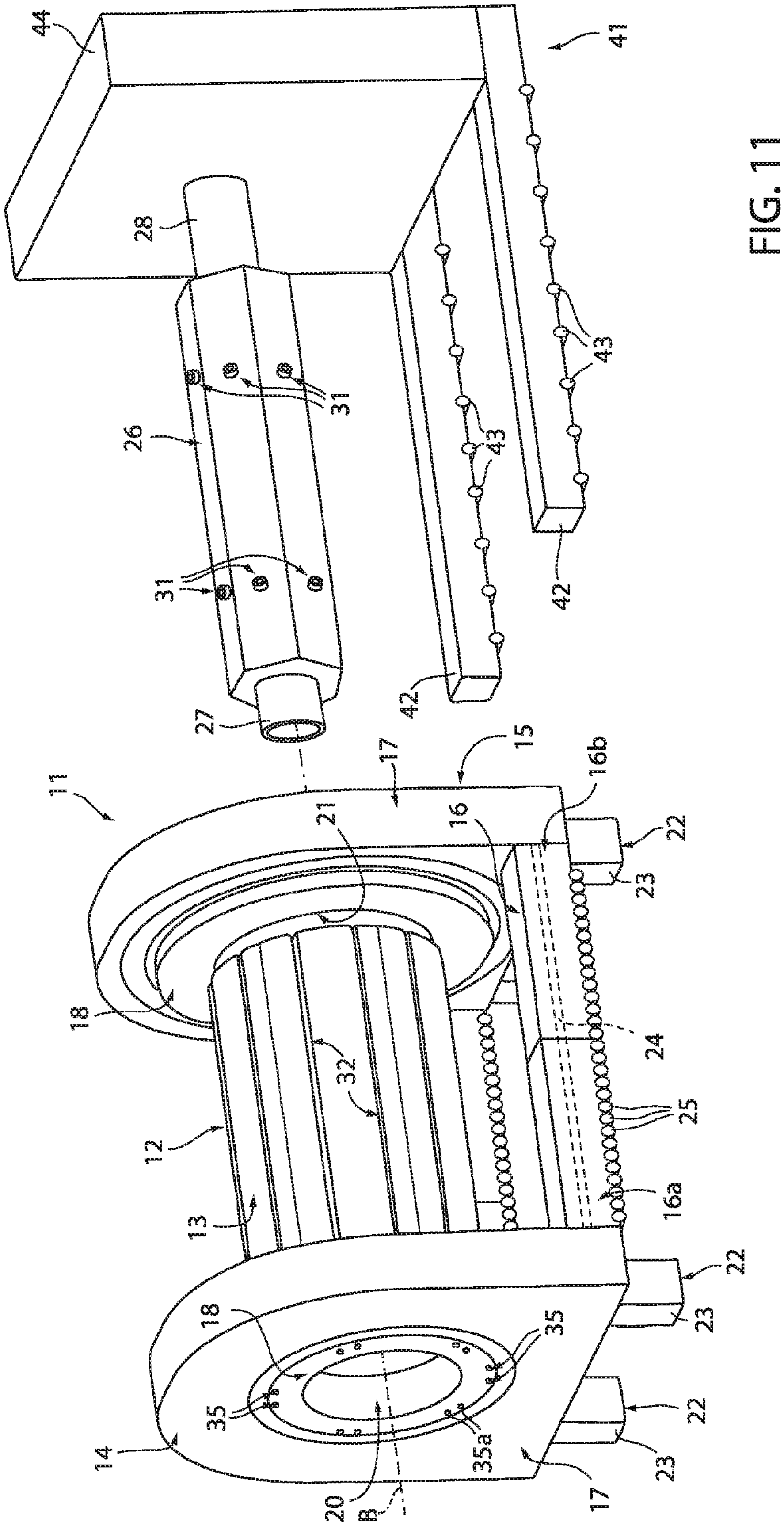
FIG. 11 is a perspective view, with parts removed for clarity and parts on a small scale, of the equipment shown in FIG. 8 in a further preparatory step for the laminating operation, wherein the central shaft and the linear actuators in FIG. 4 are extracted by the trolley shown in FIG. 3B from the rest of the equipment.

As can be seen in FIGS. 2, 8 and 11, the fixed portion 17 of each header 14, 15 externally surrounds the respective movable portion 18, which has a cylindrical outer profile of axis B and is mounted through the fixed portion 17 itself by the interposition of washers and/or bushings which are known per se and not shown; in this way, the movable portion 18 of each header 14, 15 can rotate about the axis B relative to the respective fixed portion 17.

Both movable portions 18 of the headers 14, 15 are centrally provided with respective central through openings 20, 21, which in this case have a circular profile and are identical to each other.

According to a possible alternative, not shown, especially if it is necessary to make a structural element with a configuration tapered towards one of its axial ends, the openings of the movable portions of the headers could have different diameters or sizes.

Preferably, each header 14, 15 is mounted on a respective pair of guide uprights 22 which allow for height adjustment. In particular, in a condition of stable positioning on the floor surface, the guide uprights 22 protrude inferiorly from each header 14, 15 and from the longitudinal crosspieces 16 to define respective support feet 23 for the resting of the support frame 11 on the floor surface.

The longitudinal crosspieces 16 also have a length adjustable parallel to the axis B; for this purpose, according to a preferred embodiment, each longitudinal crosspiece 16 is formed by two bars 16*a*, 16*b* which are coaxially mounted so that they can slide on a guide rod 24.

Furthermore, the longitudinal crosspieces 16 are preferably provided with wheels 25 to enable the equipment 10 to be moved after the sliding of the headers 14, 15 on the respective guide uprights 22 until the wheels 25 themselves are brought into contact with the floor surface and at the same time the support feet 23 are made to disappear.

All the described adjustments allow the support frame 11 to adapt, both in the longitudinal direction, i.e., parallel to the axis B, and in height, to different sizes of the laminating mandrel 12 and therefore of the structural element 1 to be made.

The height adjustment of the headers 14, 15 also makes it easier to fit the entire equipment 10 in autoclaves of different sizes, as will be explained in greater detail below.

With reference to FIGS. 3A, 3B, 4, 8 and 11, the laminating mandrel 12 comprises:

- a central shaft 26 of axis B (FIG. 4), which in this case has a polygonal, in particular hexagonal profile;
- a plurality of sectors 30 angularly spaced apart about the axis B; and
- a plurality of linear actuators 31, in this case telescopic actuators or jacks, extending between the central shaft 26 and the respective sectors 30 to move the latter between an expanded laminating position (FIGS. 3B, 8 and 11), in which the aforementioned sectors 30 are adjacent to each other at the maximum distance from the central shaft 26 and define the laminating surface 13, and a contracted position (FIG. 3A), in which the aforementioned sectors 30 are adjacent to the central shaft 26 and partially overlapping each other.

Preferably, the central shaft 26 carries the linear actuators 31 externally cantilevered.

Figure 5:
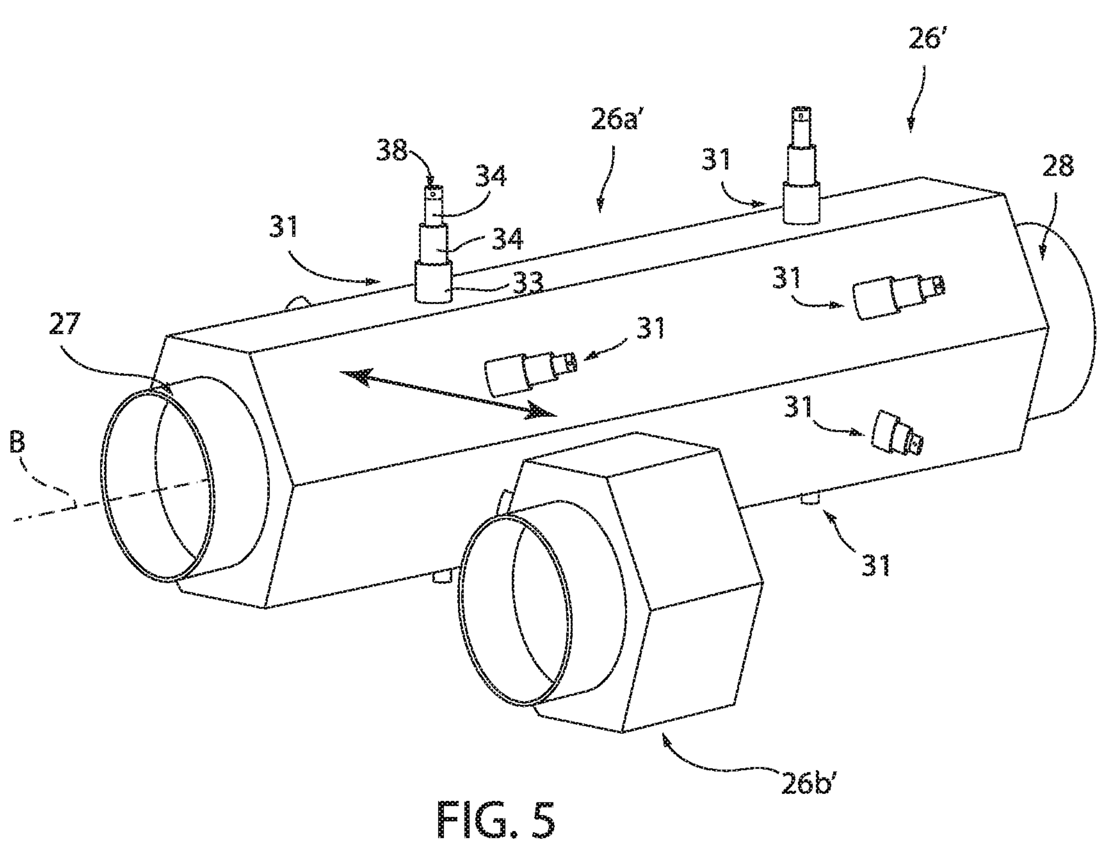
FIG. 5 is an exploded perspective view, with parts removed for clarity, of a possible variant of the central shaft in FIG. 4, consisting of a base module, identical to the central shaft in FIG. 4, and an auxiliary module.
Figure 6:
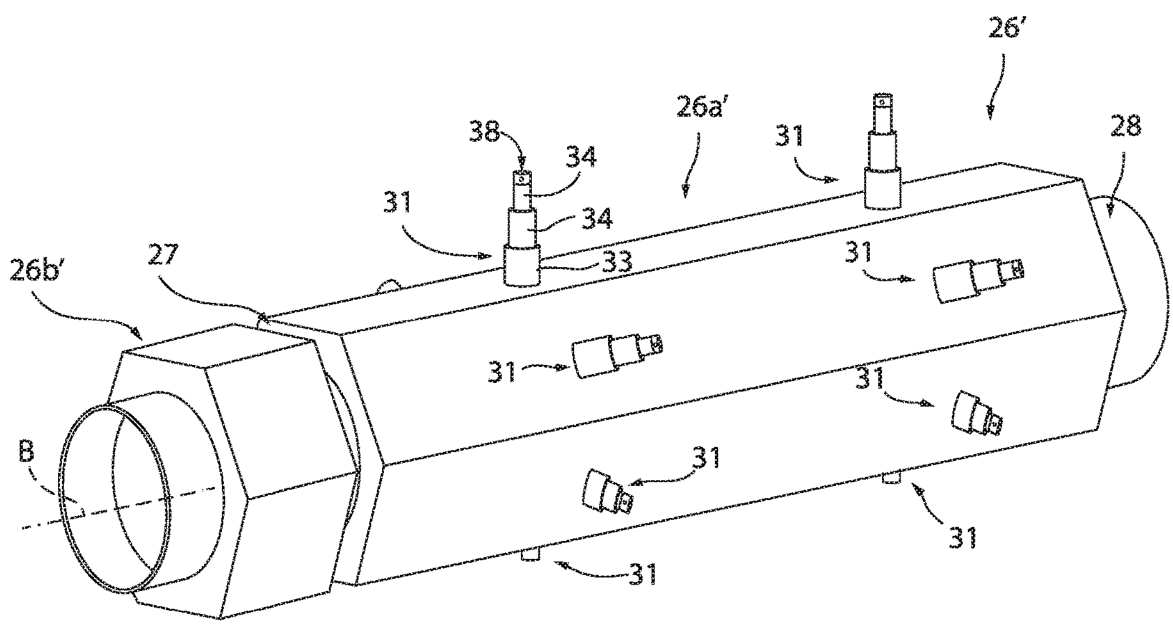
FIGS. 6 and 7 are perspective views, with parts removed for clarity, of the base and auxiliary modules of the variant in FIG. 4, during assembly and assembled together, respectively.
Figure 7:
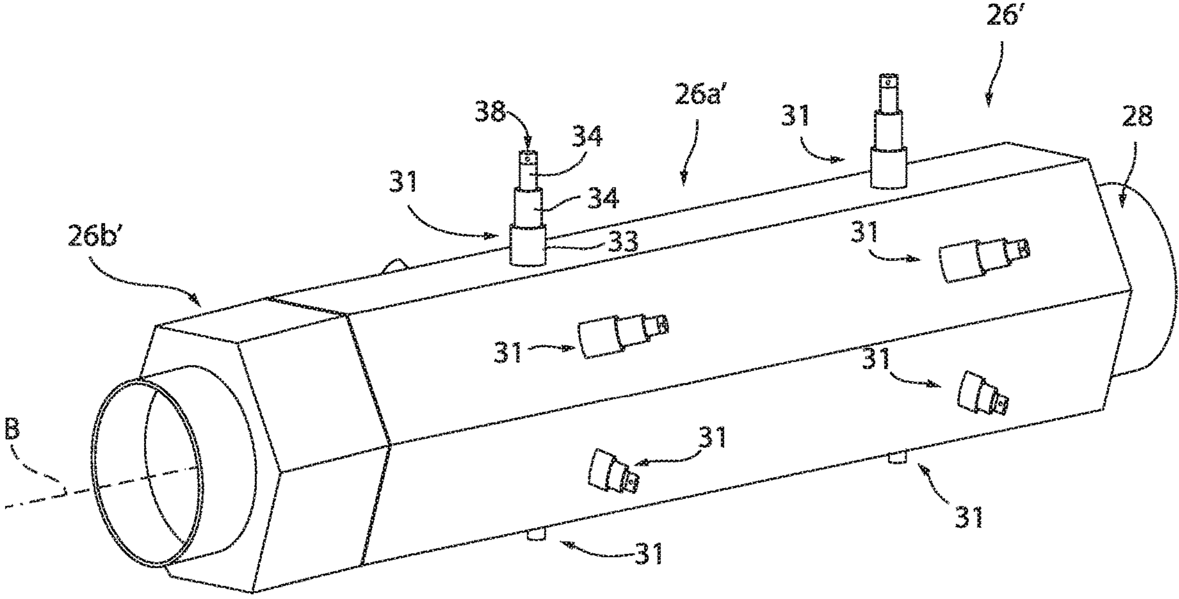

According to the variant shown in FIGS. 5, 6 and 7, the central shaft, here indicated as 26', may consist of a base module 26*a*' and one or more auxiliary module(s) 26*b*' optionally axially couplable to one (27) or both (27, 28) of the ends of the base module 26*a*' or to the auxiliary module(s) 26*b*' itself/themselves already assembled to increase the axial length of the central shaft 26'.

In the example shown in FIGS. 5, 6 and 7, the central shaft 26' consists of the base module 26*a*', which is identical in length to the central shaft 26, and an auxiliary module 26*b*' coupled to the end 27 of the base module 26*a'*.

With reference to FIGS. 3A, 3B, 10A, 10B and 11, the sectors 30 consist of respective curved panels delimited, towards the central shaft 26, by respective inner surfaces 29*a* and, on the opposite side, by respective outer surfaces 29*b*, forming respective portions of the laminating surface 13.

The sectors 30, on their outer surfaces 29*b*, have one or more longitudinal recesses or grooves 32 configured to receive the previously formed stringers 4 prior to the step of bringing them into contact with the skin 3 and to support them during the same step and in a subsequent curing step or operation, as better described below.

Conveniently, the process of making the structural element 1 further comprises, subsequent to the step of forming the stringers 4 and prior to the step of bringing them into contact with the skin 3, the step of positioning a longitudinal insert, commonly known as a "bladder" and not shown, inside the raised portion 6 of each stringer 4; in this way, each of the aforesaid inserts will be entirely housed within the cavity formed between the skin 3 and the respective stringer 4 once the latter are brought into contact with each other.

With reference to FIGS. 3A, 3B, 4, 10A and 10B, and 11, each linear actuator 31 comprises a hollow casing or tubular sleeve 33, fixed to and externally cantilevered from the central shaft 26, and one or more rod(s) 34 sliding with respect to the sleeve 33 and/or to any other rod(s) 34.

By moving the rod(s) 34, each linear actuator 31 can take different overall lengths ranging from a minimum length to a maximum length; the rod(s) 34 of each linear actuator 31 protrude(s) from the respective sleeve 33 at least in configurations other than the minimum length.

The maximum stroke of the rod(s) 34 of each linear actuator can be adjusted as a function of the conformation of the sectors 30 and the maximum radial footprint of the laminating surface 13 defined by the sectors 30 themselves.

Advantageously (FIGS. 2, 8, 9, 10A, 10B and 11), the equipment 10 further comprises:

- first constraining members 35 for connecting in a releasable manner the sectors 30 in the expanded laminating position to the movable portions 18 of the headers 14, 15; and
- second constraining members 36 connecting the linear actuators 31 to the sectors 30 in a releasable manner so as to enable the extraction of the central shaft 26 and the linear actuators 31 from the support frame 10 in the condition in which the sectors 30, arranged in the expanded position, are connected to the movable portions 18 of the headers 14, 15 by means of the constraining members 35.

In particular, in the example shown, the constraining members 35 comprise respective bolts 35*a* extending parallel to the axis B and releasably connecting the movable portions 18 of the headers 14, 15 to the opposite axial end edges of the sectors 30.

In particular, each bolt 35*a* engages corresponding holes 35*b*, 35*c* obtained in the movable portion 18 of the related header 14, 15 and in the related sector 30, respectively.

The sectors 30 are also connected to each other in the expanded laminating position by known-type systems described in patent EP2644359B1 in the name of the same applicant.

According to a possible alternative, not shown, the constraining members 35 could be closures or connections that can be operated electronically to make the sectors 30 integral with the movable portions 18 of the headers 14, 15.

In the example shown (see in particular FIGS. 10A and 10B), each constraining member 36 comprises an engagement seat 37, obtained in the respective sector 30, and a coupling head 38 carried by the end rod 34 of the respective linear actuator 31 and suitable to be coupled in a releasable manner to the engagement seat 37 itself.

In detail, in the solution shown here, the coupling head 38 of each linear actuator 31 is movable between a contracted configuration (FIG. 10A), in which it can freely enter or exit the respective engagement seat 37, and an expanded configuration (FIG. 10B), in which it protrudes radially with respect to the rest of the rod 34 so that it can be held in the engagement seat 37 itself by being coupled thereto.

Figure 14:
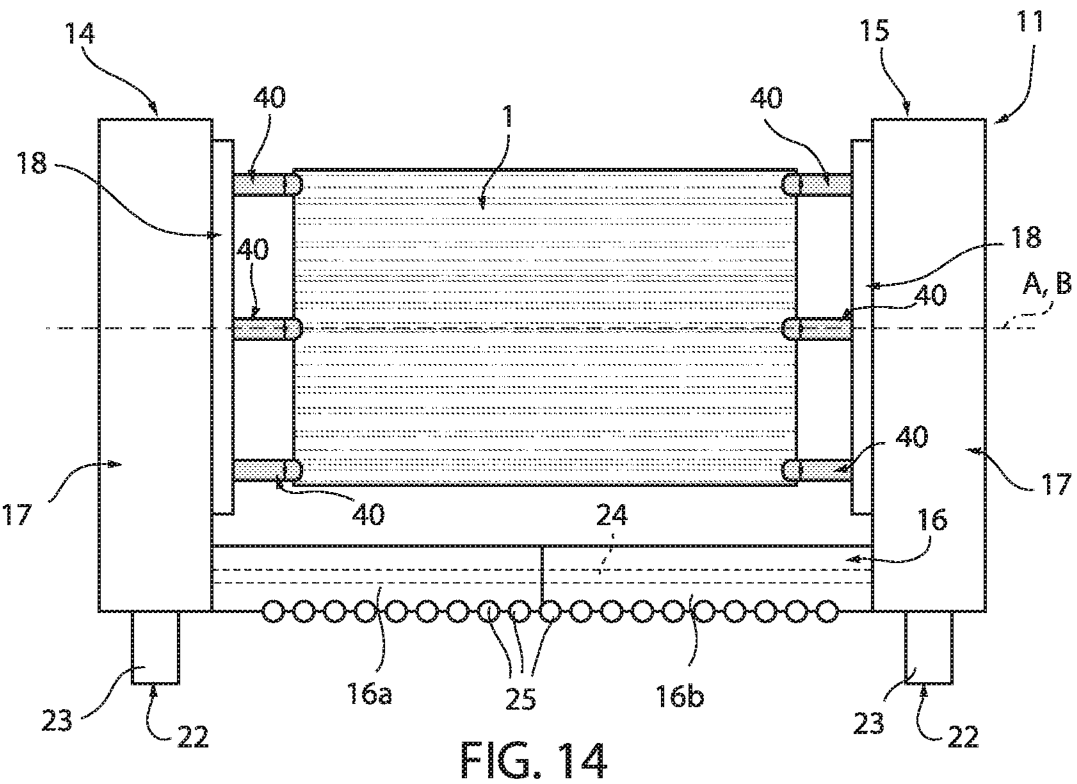
FIG. 14 is a side view of the equipment in FIG. 13 after the extraction of the laminating mandrel from the cured structural element and at the stage when this structural element is supported by the support frame alone.

With reference to FIG. 14, the headers 14, 15 of the support frame 11 further comprise a plurality of gripping members 40, which are movable between a resting position, in which they are stowed within the respective header 14, 15, and an operating position, in which they protrude from the respective header 14, 15 and hold the opposite axial end edges of the cured structural element 1 to allow the extraction of the laminating mandrel 12 from the structural element 1 itself through the central opening 20 of the header 14.

In particular, the gripping members 40 are movable between the resting and operating positions parallel to the axis B.

The gripping members 40 are also carried by the movable portions 18 of the respective headers 14, 15.

In the condition in which the gripping members 40 are arranged in the operating position and hold the cured structural element 1, it is possible to extract the laminating mandrel 12 from the structural element 1 upon displacement, carried out by the linear actuators 31, of the sectors 30 from the expanded laminating position to the contracted position.

Figures 3A, 3B:
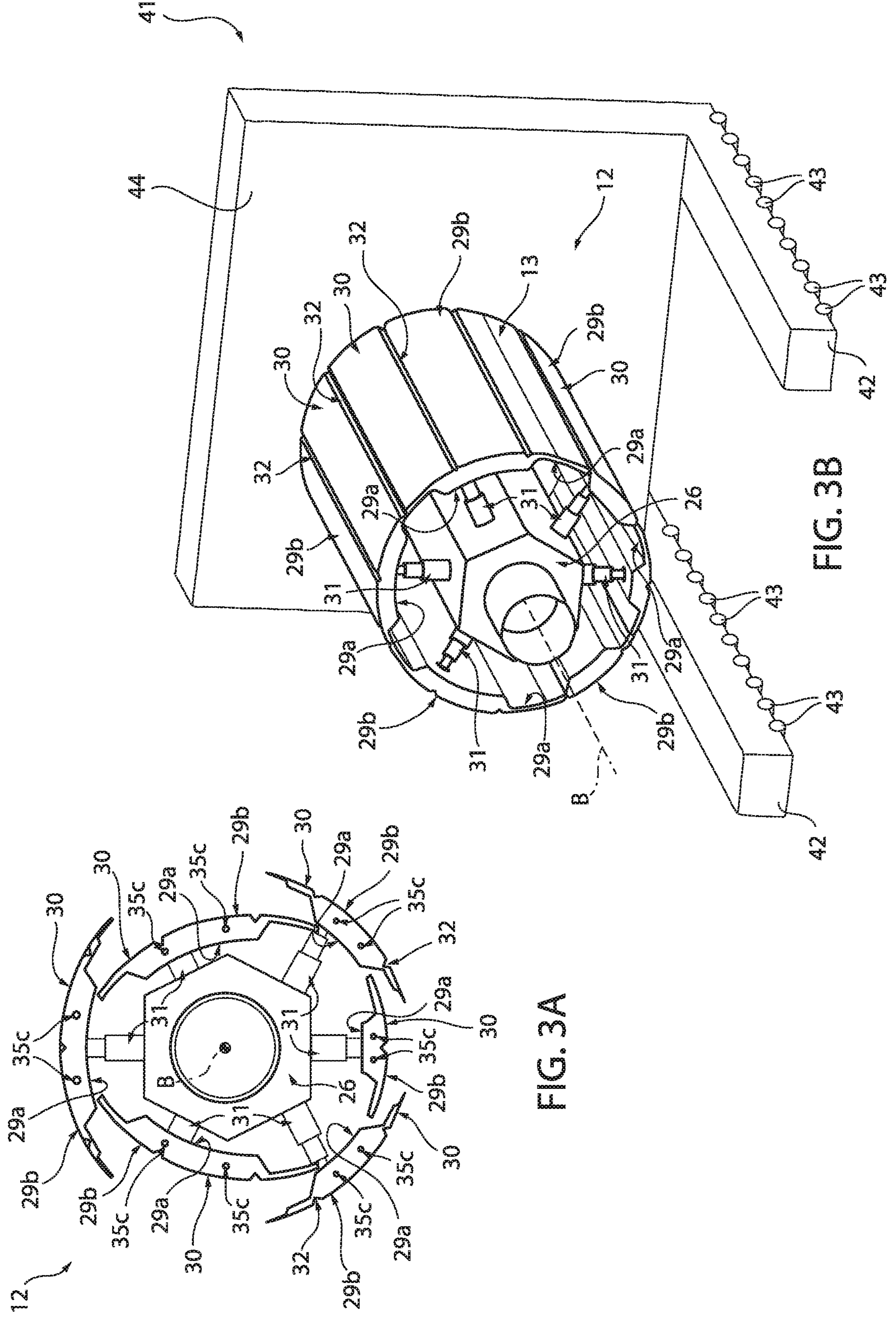
FIG. 3A is a front view, with parts removed for clarity, of a laminating mandrel of the equipment according to the present invention, intended to be mounted on the support frame in FIG. 2 and arranged in a contracted position.
FIG. 3B is a perspective view, on a small scale, of the laminating mandrel in FIG. 3A carried by a handling trolley.
Figure 4:
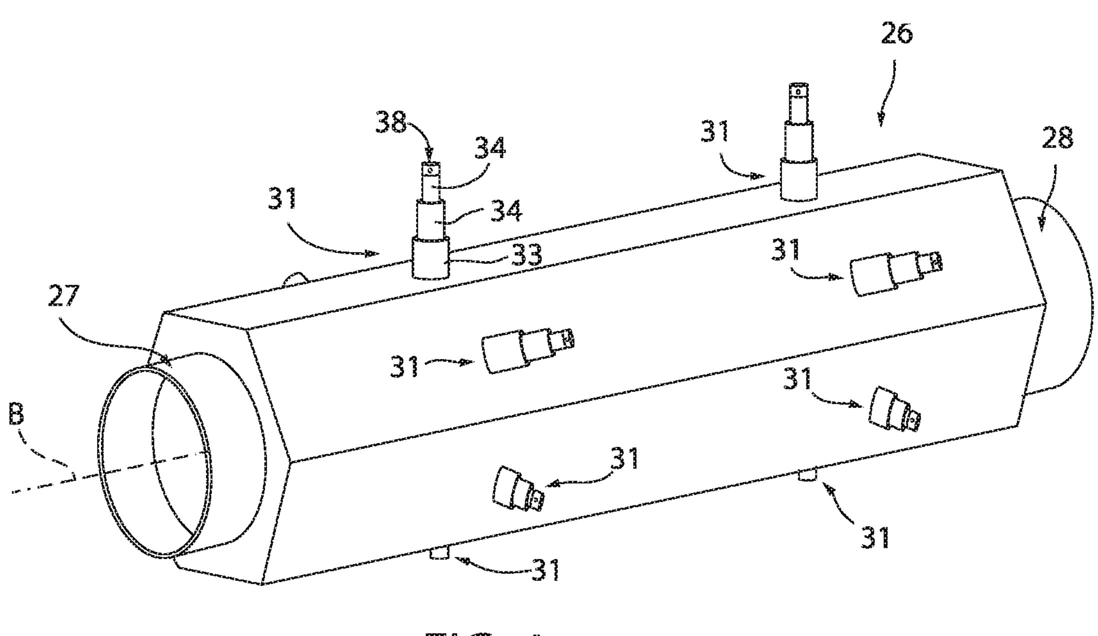
FIG. 4 is a perspective view, with parts removed for clarity, of a central shaft of the laminating mandrel in FIGS. 3A and 3B, equipped with linear actuators.

The insertion and extraction of the laminating mandrel 12 into/from the support frame 11 as well as the insertion and extraction of the central shaft 26 with the linear actuators 31 into/from the sectors 30 is preferably carried out by means of a handling trolley 41, shown in FIGS. 3B and 11.

In particular, the handling trolley 41 comprises two horizontal longitudinal bars 42 fitted with wheels 43 and a header 44 orthogonal to the longitudinal bars 42 and overlying respective adjacent ends of the latter.

The longitudinal bars 42 are designed to slide, in use, under the longitudinal crosspieces 16 of the support frame 11 so that the header 44 is positioned facing one of the headers 14, 15 and parallel thereto.

The header 44 of the handling trolley 41 is also equipped with constraining means, which are known per se and not shown, such as bolts, to integrally connect the central shaft 26 orthogonally cantilevered to the header 44.

In use, in order to make the structural element 1, the first step is to prepare the equipment 10 for the laminating operation.

In particular, the sectors 30, which are connected to the respective linear actuators 31 by means of the constraining members 36, are arranged in the contracted position adjacent to the central shaft 26.

At this point, the laminating mandrel 12 with the sectors 30 in the contracted position is inserted, with the aid of the handling trolley 41, through one of the central openings 20, 21 of the headers 14, 15, inside the support frame 11 between the headers 14 and 15 themselves.

By actuating the linear actuators 31, the sectors 30 are then moved into the expanded laminating position. Subsequently, the sectors 30, still kept in the expanded laminating position, are connected to the movable portions 18 of the headers 14, 15 by means of the constraining members 35 (FIG. 8).

At this point, t is possible to release the constraining members 36 in order to disconnect the linear actuators 31 from the respective sectors 30 and retract the linear actuators 31 towards the central shaft 26.

In this condition, the central shaft 26 with the retracted linear actuators 31 is extracted, again with the aid of the handling trolley 41, from the support frame 11 (FIG. 11) and can thus be used for other applications in parallel, for example to make another structural element 1.

The operation of laminating the laminating surface 13 of the laminating mandrel 12 can then be started in the conventional way.

In particular, the previously formed, uncured or pre-cured stiffening stringers 4 are inserted into the respective grooves 32 of the sectors 30, in combination with noodles and bladders.

Figure 12:
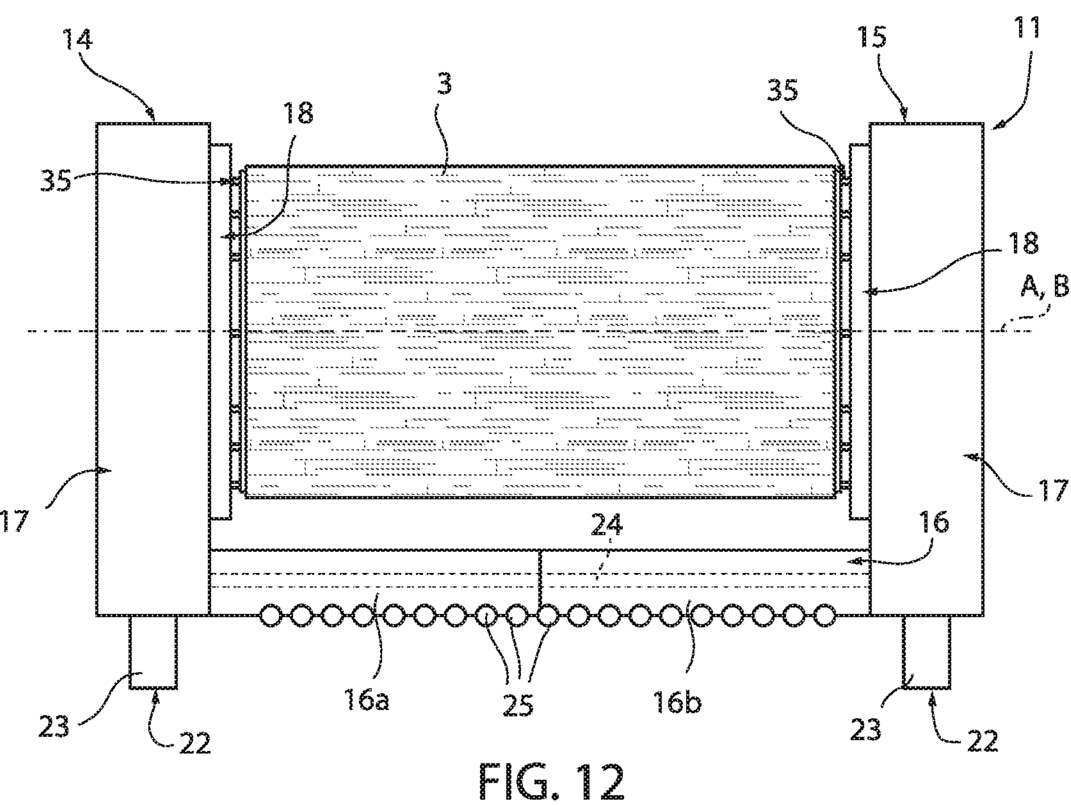
FIG. 12 is a side view, with parts removed for clarity and parts on a small scale, of the equipment in FIG. 8 at the end of the laminating operation.

The skin 3 is then formed by laminating the several necessary layers of the uncured or pre-cured composite material on the laminating surface 13 as well as on the stringers 4 and on the different types of inserts placed in the grooves 32 (FIG. 12).

During the laminating operation, the sectors 30 are rotated about the axis B integrally with the movable portions 18 of the headers 14, 15.

At the end of the laminating operation, the equipment 10 with the laminated composite material is transported into an autoclave (known per se and not shown) to carry out a curing cycle.

The transport can be carried out advantageously by making the support feet 23 disappear into the respective headers 14, 15 and bringing the wheels 25 to rest on the floor surface on which they can then slide.

At the end of the curing cycle, the support frame 11 and the sectors 30 are extracted from the autoclave in order to continue with the traditional steps of completing the making of the structural element 1.

Figure 13:
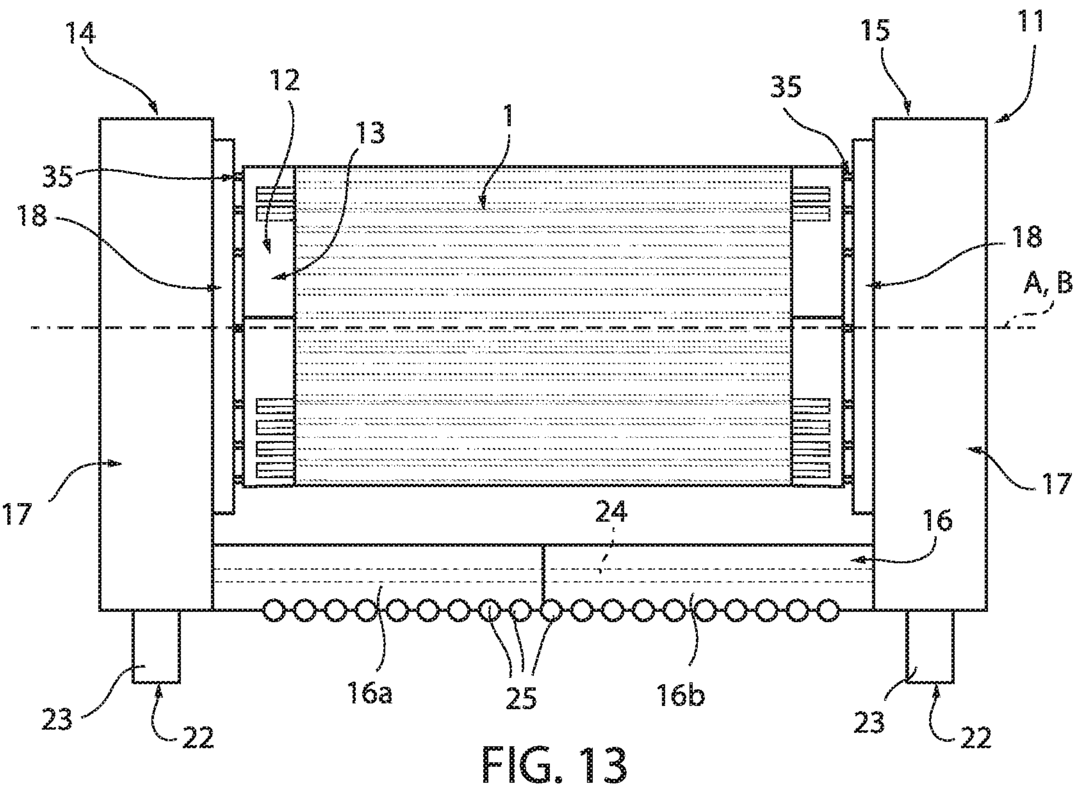
FIG. 13 is a side view of the equipment in FIG. 12 at the end of a curing and finishing cycle.

In particular, the cured structural element 1 is trimmed (the laminated material of the skin 3 is increased from the nominal) and drilled, if required, according to the requirements of the project. As can be seen in FIG. 13, the opposite axial end edges of the cured structural element 1 are cut and subjected to a finishing operation (FIG. 13). These operations are carried out while the laminating mandrel 12 is still mounted on the support frame 11 and carries the cured structural element 1 externally.

Figure 10A:
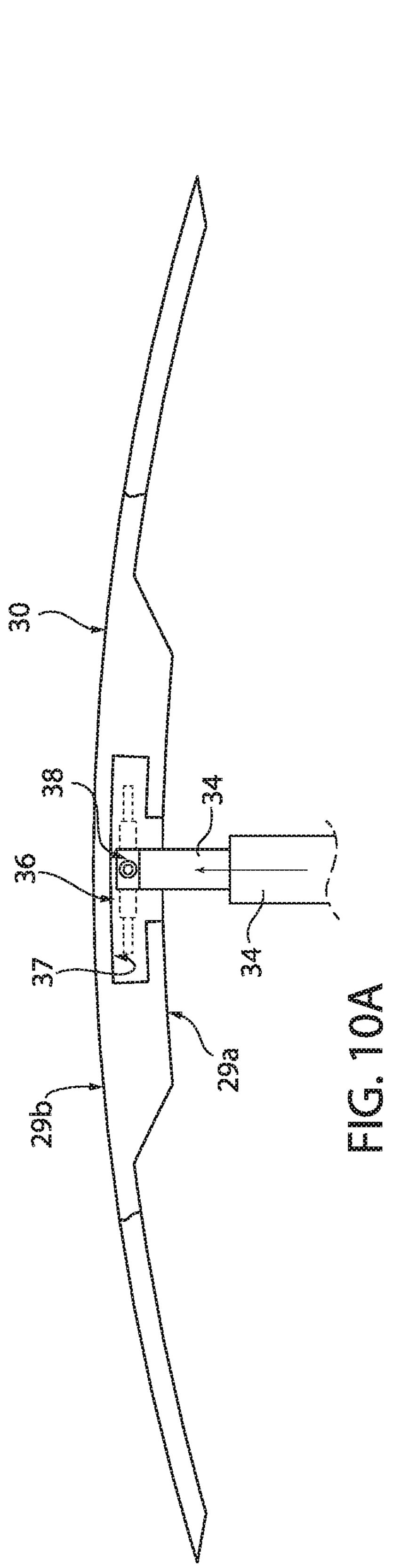
FIGS. 10A and 10B are side views, with parts removed for clarity and parts on an enlarged scale, of a detail inside the laminating mandrel shown in FIG. 8.
Figure 10B:
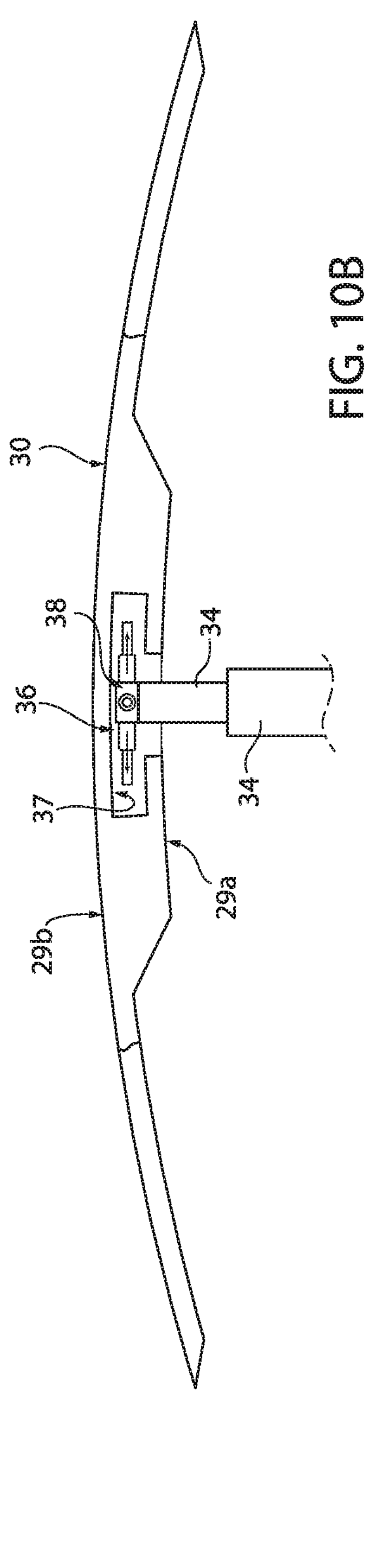

At this point, the central shaft 26 and the linear actuators 31 are then re-inserted into the sectors 30 through the central opening 20 of the crosspiece 14 and with the aid of the handling trolley 41. In addition, the linear actuators 31 are re-connected to the sectors 30 by means of the constraining members 36 (FIG. 10B).

The gripping members 40 are then moved from the resting position to the operating position, in which they protrude from the respective headers 14, 15 and hold the opposite axial end edges of the structural element 1. In practice, the structural element 1 is attached to the headers 14, 15.

In this operating condition, it is possible to extract the laminating mandrel 12 from the structural element 1 upon displacement, carried out by the linear actuators 31, of the sectors 30 from the expanded laminating position to the contracted position.

The laminating mandrel 12 can then also be extracted from the support frame 11 through one of the central openings 20, 21 of the headers 14, 15 and again with the aid of the handling trolley 41.

The structural element 1 thus made will therefore have its longitudinal axis A coinciding with the axis B of the laminating mandrel 12.

In this condition, due to the connection of the structural element 1 to the movable portions 18 of the headers 14, 15 and thus to the possibility that the structural element 1 itself can rotate about its axis A which coincides with the axis B, a series of non-destructive tests can be carried out to verify its feasibility.

The structural element 1 is also subjected to dimensional measurements to check any "out of for tolerance".

As a result of this testing, rework may be required, where necessary, to restore the features of the product which are required by the project.

In this step, it is also possible to apply protective paints on the structural element 1, which is thus protected against contact with metallic materials, especially aluminium, UV rays, moisture and anything else required by the project.

Once all the above operations have been completed, the flow of making the structural element 1 is completed by the installation thereon of other stiffening and non-stiffening elements which are required by the project and complete its configuration.

This step, too, can be advantageously carried out by keeping the structural element 1 connected to the movable portions 18 of the headers 14, 15 of the support frame 11.

The advantages enabled by the present invention are apparent from an examination of the above-described and -illustrated features of the equipment 10 and of the process for making it.

In particular, the described solution enables, in a simple way, optimization of the work areas necessary for the production of structural elements 1, such as aircraft fuselage portions with constant or tapered sections.

In practice, the manufacturing process, including the actual making, the finishing and drilling operations, the quality and dimensional checks, and any mounting of additional stiffening elements, can be fully completed on the equipment 10, with the possibility of re-using part of the laminating mandrel 12 (central shaft 26 and linear actuators 31) in parallel for the manufacture of other structural elements, even if they have different sizes (e.g., axial length and diameter). This reduces the cost and time of the manufacturing process.

Furthermore, the equipment 10 is extremely flexible and suitable not only for use in making structural elements of different axial and radial sizes but also for fitting in autoclaves of different sizes.

Lastly, is clear it that modifications and variations can be made to the equipment 10 and the process of making said equipment 10 described and illustrated herein without thereby departing from the scope of protection defined by the claims.

The invention claimed is:

1. An equipment for making a structural element of composite material having a longitudinal axis and an axial cavity, said equipment comprising:

a support frame; and a laminating mandrel, which is mounted on said support frame in a rotatable manner about a central axis and defines an outer laminating surface for laminating one or more layers of composite material to be cured or pre-cured into the structural element;

wherein said support frame includes:

two vertical headers, facing each other and parallel to each other, extending in use transversely to said central axis of said laminating mandrel and capable of accommodating between them the laminating mandrel; and longitudinal connecting means for longitudinally connecting said headers;

each header comprising a fixed portion and a movable portion, coaxially receiving said laminating mandrel and rotatable about said central axis with respect to said fixed portion;

wherein said laminating mandrel comprises:

a central shaft defining said central axis;

a plurality of sectors angularly spaced apart about said central axis; and a plurality of linear actuators each extending between said central shaft and a respective sector of the plurality of sectors to move the sectors between an expanded laminating position, in which said sectors are adjacent to each other at the maximum distance from said central shaft and define said laminating surface, and a contracted position, in which said sectors are adjacent to said central shaft and partially overlapping each other;

wherein said equipment also comprises:

first constraining means for connecting in a releasable manner said sectors in said expanded laminating position to said movable portions of said headers; and second constraining means connecting each of said linear actuators to the respective sector in a releasable manner so as to enable the extraction of said central shaft and said linear actuators from remaining parts of said equipment in the condition in which said sectors, arranged in said expanded laminating position, are connected to said movable portions of said headers by means of said first constraining means.

2. The equipment according to claim 1, wherein said movable portion of at least one of said headers has a central opening through which said laminating mandrel or an assembly formed by said central shaft and said linear actuators can be inserted in and extracted from said support frame.

3. The equipment according to claim 2, wherein said headers further comprise gripping members, which are movable between a resting position, in which they are stowed within each respective header, and an operating position, in which they protrude from each respective header and hold the opposite end edges of the cured structural element to allow the extraction of said laminating mandrel from said cured structural element through said central opening.

4. The equipment according to claim 3, wherein said gripping members are movable between said resting and operating positions parallel to said central axis.

5. The equipment according to claim 3, wherein said gripping members are carried by the movable portion of each header.

6. The equipment according to claim 3, wherein the extraction of said laminating mandrel from the cured structural element occurs upon displacement, by said linear actuators, of said sectors from said expanded laminating position to said contracted position.

7. The equipment according to claim 1, wherein each linear actuator comprises a tubular sleeve, fixed externally to said central shaft, and at least one rod sliding with respect to said tubular sleeve to set positions protruding by different amounts from the tubular sleeve; and wherein the maximum stroke of said at least one rod of each linear actuator can be adjusted as a function of the conformation of the sectors and the maximum radial footprint of the laminating surface defined by the sectors.

8. The equipment according to claim 7, wherein said for each linear actuator, the second constraining means comprises a free end head of the at least one rod releasably coupled with an engagement seat of the respective sector.

9. The equipment according to claim 1, wherein each header is mounted on guide uprights allowing for height adjustment.

10. The equipment according to claim 9, wherein said guide uprights protrude inferiorly from each header to define respective support feet of said support frame, and wherein said longitudinal connecting means are provided with wheels to enable the equipment to be moved after the sliding of the headers on the respective guide uprights until the wheels themselves are brought into contact with the floor surface and at the same time said support feet are made to disappear.

11. The equipment according to claim 1, wherein said longitudinal connecting means comprise at least one pair of longitudinal crosspieces extending between said headers and having adjustable lengths.

12. The equipment according to claim 1, wherein said central shaft comprises a base module and one or more auxiliary modules axially couplable to one or both ends of the base module or to the auxiliary module(s) already assembled to increase the axial length of the central shaft.

13. A process for making a structural element of composite material having a longitudinal axis and an axial cavity by means of the equipment according to claim 1, said process comprising the steps of:

(a) connecting said sectors to said linear actuators and arranging the sectors in said contracted position on said central shaft;

(b) mounting the laminating mandrel with the sectors in the contracted position on said support frame;

(c) moving, by means of the linear actuators, said sectors into said expanded laminating position;

(d) connecting said sectors in the expanded laminating position to the movable portions of said headers by means of said first constraining means;

(e) releasing said second constraining means to disconnect said linear actuators from said sectors;

(f) retracting said linear actuators toward the central shaft;

(g) extracting the central shaft with the retracted linear actuators from said support frame;

(h) laminating with uncured or pre-cured composite material said laminating surface of said sectors;

(i) transporting the support frame and the sectors attached to it together with the laminated composite material to an autoclave to perform a cure cycle to form the structural element;

(l) taking the assembly of step (i) out of the autoclave;

(m) re-inserting the central shaft with the linear actuators inside the sectors and connecting the linear actuators to the sectors by means of said second constraining means;

(n) attaching the cured structural element to said headers;

(o) retracting, by means of the linear actuators and with the second constraining means active, the sectors into the contracted position on said central shaft; and (p) extracting the laminating mandrel with the sectors in the contracted position from the cured structural element and support frame.

14. The process according to claim 13, wherein said step (n) is carried out by moving said gripping members into the operating position, in which they hold opposite end edges of the cured structural element thereby securing them to the headers.

* * * * *